(12) United States Patent
Colombo

(10) Patent No.: US 12,297,871 B1
(45) Date of Patent: May 13, 2025

(54) SYSTEM AND METHODS FOR A CLUTCH SYSTEM BASED ON AN AXIALLY SLIDABLE SLEEVE AND RADIALLY TRANSLATABLE KEY

(71) Applicant: DANA GRAZIANO S.R.L., Turin (IT)

(72) Inventor: Silvano Colombo, Rivoli (IT)

(73) Assignee: DANA GRAZIANO S.R.L., Rivoli (IT)

( * ) Notice: Subject to any disclaimer, the term of this patent is extended or adjusted under 35 U.S.C. 154(b) by 0 days.

(21) Appl. No.: 18/499,607

(22) Filed: Nov. 1, 2023

(51) Int. Cl.
*F16D 21/06* (2006.01)
*F16D 11/00* (2006.01)
*F16D 11/16* (2006.01)
*F16D 23/02* (2006.01)
*F16D 23/14* (2006.01)

(52) U.S. Cl.
CPC .............. *F16D 21/06* (2013.01); *F16D 11/16* (2013.01); *F16D 23/02* (2013.01); *F16D 23/14* (2013.01); *F16D 2011/004* (2013.01); *F16D 2500/10462* (2013.01); *F16D 2500/30408* (2013.01)

(58) Field of Classification Search
CPC .... F16D 2011/004; F16D 11/14; F16D 11/16; F16D 21/06; F16D 23/02; F16D 23/14; F16D 2500/10462; F16D 2500/30408
USPC ....................... 192/48.8–48.91, 65, 69.91, 71
See application file for complete search history.

(56) References Cited

U.S. PATENT DOCUMENTS

| | | | | |
|---|---|---|---|---|
| 1,425,156 | A | * | 8/1922 | Widmaier ............... F16D 11/10 192/69.63 |
| 2,743,804 | A | * | 5/1956 | Roberts ................... F16D 15/00 192/48.91 |
| 4,046,210 | A | * | 9/1977 | Nelson .................... F16D 43/26 475/221 |
| 5,775,165 | A | | 7/1998 | Lu |
| 5,827,148 | A | * | 10/1998 | Seto ...................... B60W 10/04 74/336 R |
| 9,358,866 | B2 | | 6/2016 | Hartz et al. |
| 2012/0247241 | A1 | | 10/2012 | Takahashi et al. |

* cited by examiner

Primary Examiner — Richard M Lorence
(74) Attorney, Agent, or Firm — McCoy Russell LLP

(57) ABSTRACT

Methods and systems are provided for a dog clutch engagement system of a transmission, the dog clutch engagement system including a dog clutch comprising an axially movable sleeve, a first output disk, a second output disk, and a radially translatable key. In one example, a method for operating the dog clutch comprises receiving output from sensors that indicate a rotational speed difference between a sleeve and a first output disk is within a rotational speed difference threshold, the rotational speed of the first output disk and the sleeve being nearly the same, axially sliding a sleeve of the clutch from a neutral position to a first position via an actuator, and rotating the sleeve at the first position to enable a key to encounter an internal cavity and extend into the internal cavity of the first output disk.

18 Claims, 9 Drawing Sheets

SYSTEM AND METHODS FOR A CLUTCH SYSTEM BASED ON AN AXIALLY SLIDABLE SLEEVE AND RADIALLY TRANSLATABLE KEY

TECHNICAL FIELD

The present description relates generally a dog clutch engagement system, and more specifically, to a clutch using an engagement mechanism based on interlocking keys.

BACKGROUND AND SUMMARY

In automotive applications, dog clutches have been employed in certain vehicle platforms to couple rotating shafts and/or rotating components by engaging interlocking chamfered dog teeth instead of leveraging friction. Dog clutch engagement may rely on angular alignment of the chamfers of the chamfered dog teeth during conditions wherein a high torque is generated. Relying on the angular alignment of the chamfers under such conditions may introduce issues with the dog clutch engagement, such as locking, for example.

Some dog clutch engagement systems employ a dog clutch comprising a piston that engages the chamfered dog teeth and the corresponding chamfered dog teeth recesses when the piston is activated by hydraulic pressure and a piston recess that receives a piston spring when hydraulic pressure is reduced, disengaging the chamfered dog teeth from the corresponding chamfered dog teeth recesses. In this way, the dog clutch may be engaged and disengaged. However, the piston recess may create an imbalance in the opposing surface areas of the piston, which may be worsened by high centrifugal forces that cause pooling of the hydraulic fluid. Consequently, piston pressure may follow a non-linear relationship and the non-linearity may reduce the accuracy of piston control and accordingly, may result in clutch engagement issues. U.S. Pat. No. 9,358,866, B2 to Hartz et al. discloses a clutch engagement system wherein the piston includes an offset section that enables both sides of the piston to have the same area and diameter to increase piston control. The clutch hydraulics further include a spill-over feature to reduce hydrostatic locking of the clutch.

The inventors have recognized several drawbacks with Hartz's clutch engagement system as well as other previous clutch engagement systems. Manufacturing of the piston may be difficult in Hartz's clutch engagement system. Additionally, Hartz's clutch engagement system relies on managing the hydraulic fluid to prevent locking and fails to address engagement problems due to relative positioning of the components of the clutch.

The issues described above may be at least partially addressed by a clutch engagement system of a transmission system, comprising a sleeve that is axially movable, a first output disk at a first position, a second output disk at a second position, and a radially translatable key extending from the sleeve and configured to individually engage with each of the first output disk and the second output disk. In this way, locking of the clutch may be prevented by utilizing an engagement mechanism wherein the clutch relies on axial movement of the sleeve to depress the radially translatable key, the radially translatable key being extended into an internal cavity to engage the sleeve and one of the first output disk and the second output disk.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The present disclosure will be better understood from reading the following description of non-limiting embodiments, with reference to the attached drawings, wherein below.

Figure 1:
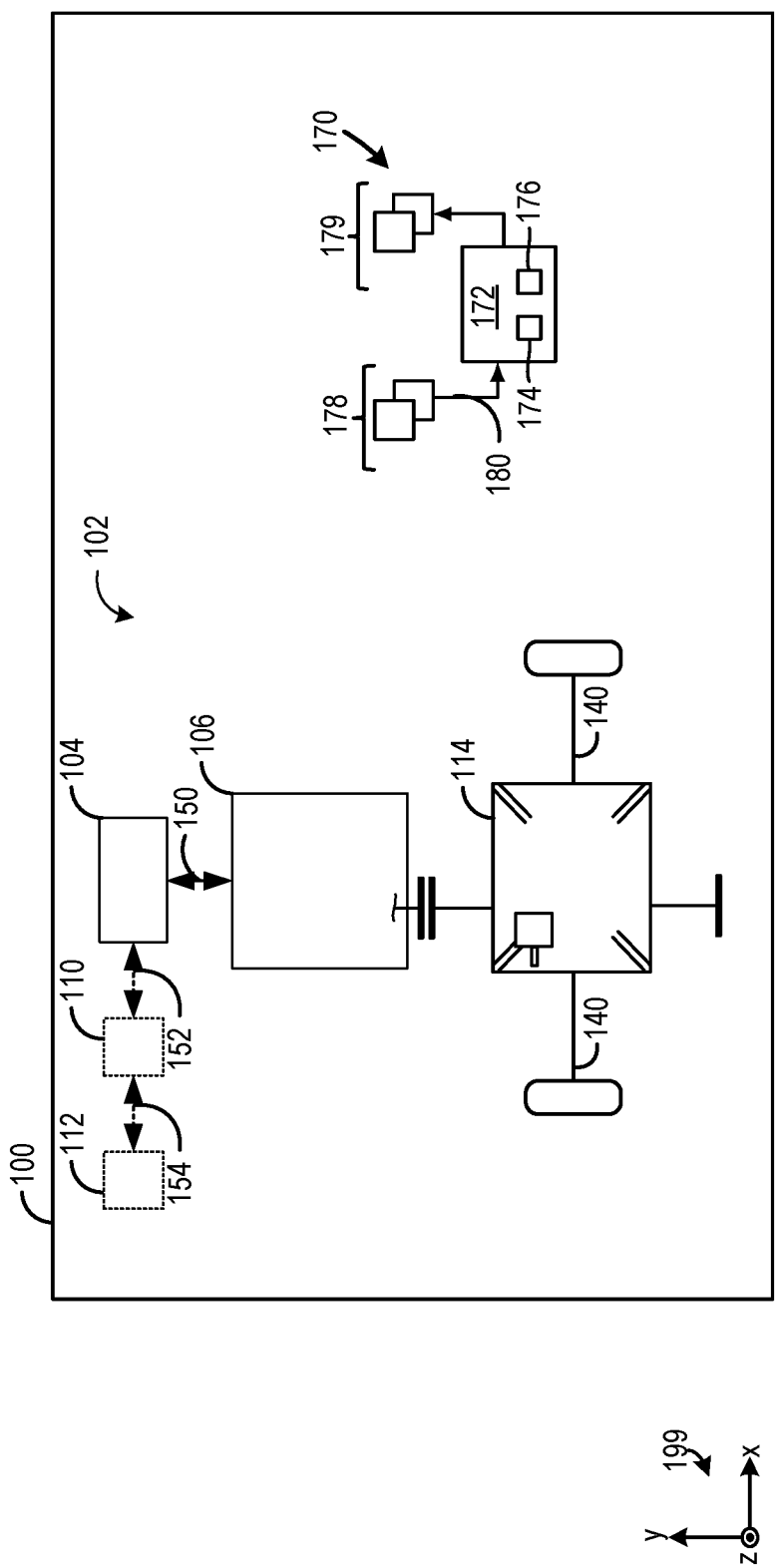
FIG. 1 schematically shows a vehicle, in accordance with one or more embodiments of the present disclosure.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

Figure 6A:
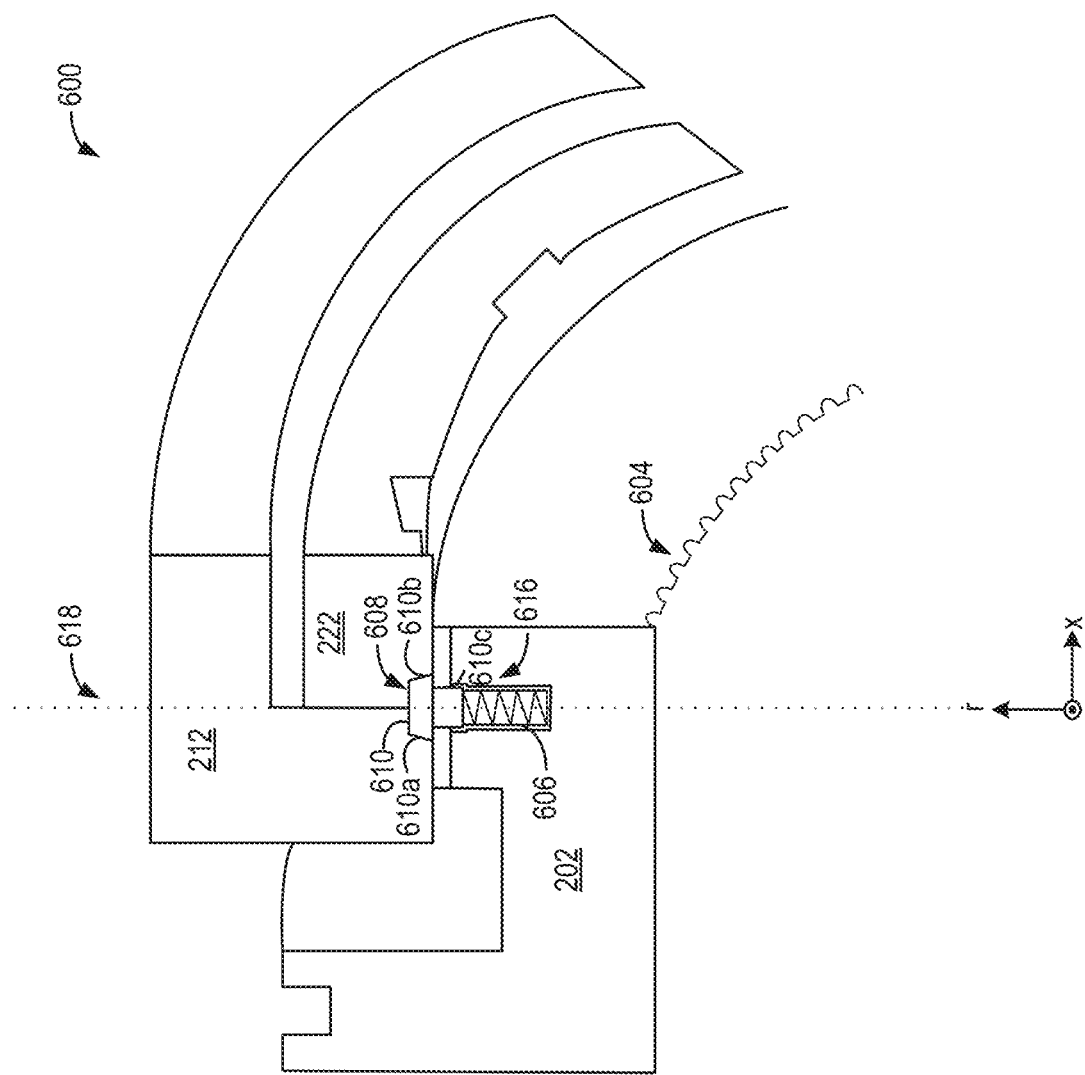
FIG. 6A shows an example of a dog clutch engagement system being in a neutral position, in accordance with one or more embodiments of the present disclosure.
Figure 6B:
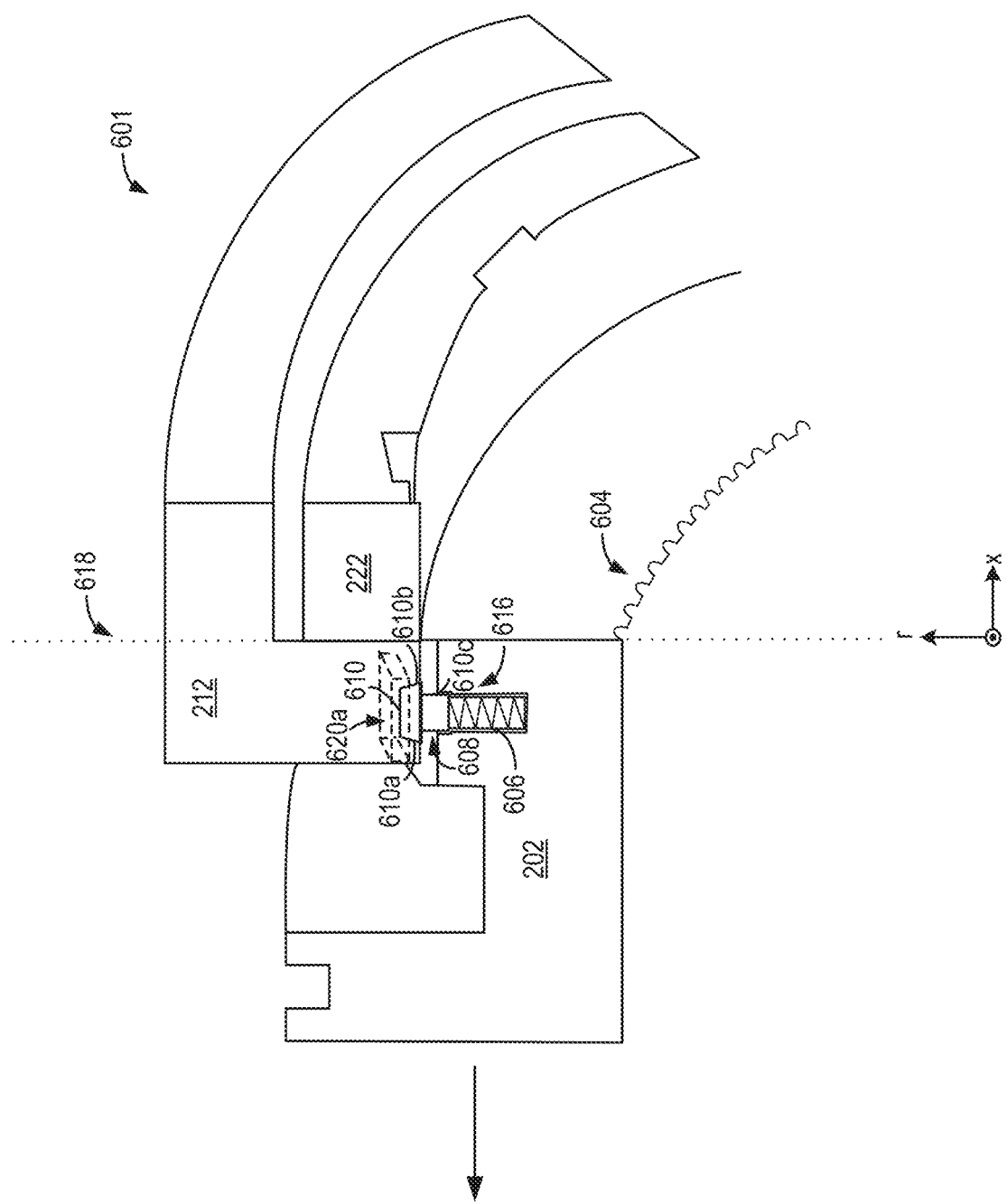
FIG. 6B shows an example of a dog clutch engagement system being in a first engaged position, in accordance with one or more embodiments of the present disclosure.
Figure 6C:
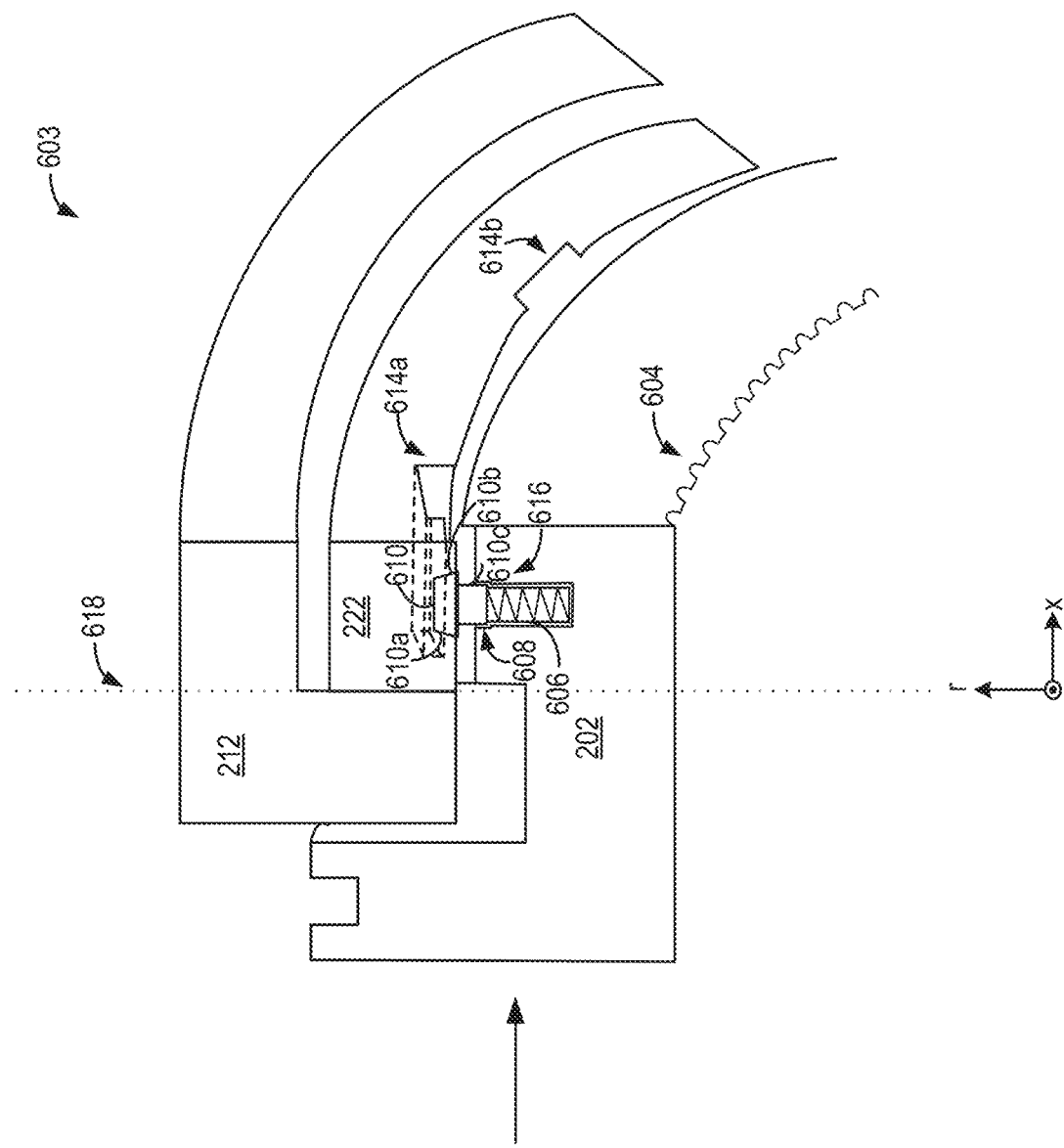
FIG. 6C shows an example of a dog clutch engagement system being in a second engaged position.
Figure 7:
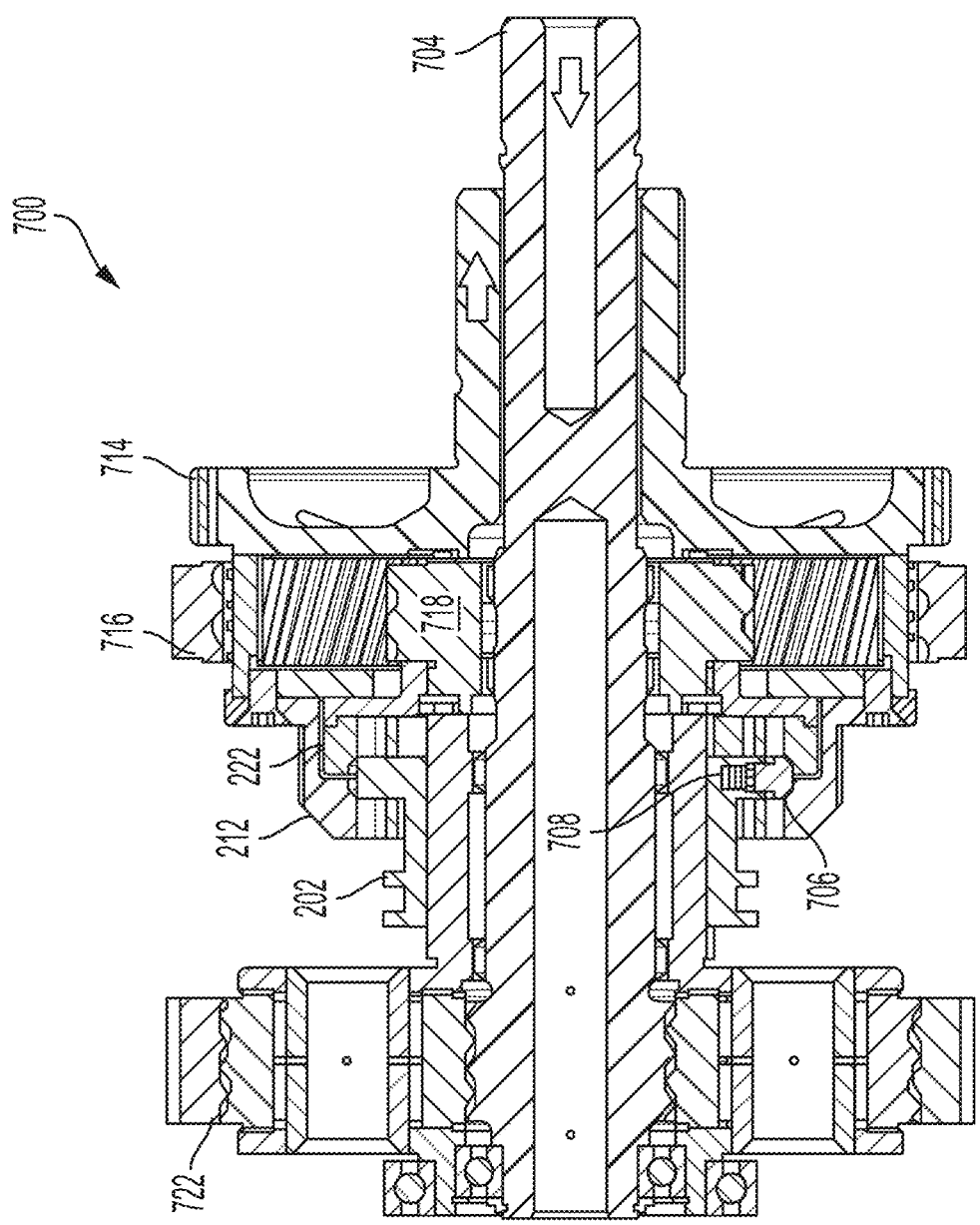
FIG. 7 shows a schematic diagram of a dog clutch engagement system integrated into an exemplary transmission system, in accordance with one or more embodiments of the present disclosure.

The following description relates to systems and methods for a dog clutch engagement system of a vehicle, such as the vehicle shown in FIG. 1. The dog clutch engagement system may include a dog clutch that couples one or more gears of a transmission system via one or more output disks, as described in reference to FIG. 2. The dog clutch engagement system may further include a sleeve that may be selectively coupled to an output disk via two or more keys, as shown with respect to FIG. 3. FIG. 4 illustrates the output disk that may be selectively coupled to the sleeve. A method for engaging and disengaging the dog clutch engagement system is described in FIG. 5. A dog clutch in a neutral position and not engaging with an output disk is shown in FIG. 6A. Examples of an engagement of the dog clutch with an output disk is illustrated in FIGS. 6B and 6C. Integration of the dog clutch engagement system is illustrated in FIG. 7.

FIG. 1 shows a vehicle 100. The vehicle 100 may be a light, medium, or heavy duty vehicle. The vehicle 100 includes an electric drive unit 102. As such, the vehicle 100 may be an electric vehicle (e.g., an all-electric vehicle or a hybrid electric vehicle which includes an internal combustion engine) or a traditional internal combustion engine (ICE) vehicle. To elaborate, the electric drive unit 102 may provide motive power to one or more drive axles 140. For instance, in one use-case example, the electric drive unit 102 may include two electric axles with separate traction motors. Alternatively, the electric drive unit 102 may include one traction motor that distributes motive power to one or both of the drive axles based on vehicle operating conditions and/or operator predilection. In either example, the electric drive unit 102 may be a four-wheel electric drive unit (e.g., all-wheel electric drive unit) where front and rear drive wheels may receive motive power during certain operating conditions. In the hybrid vehicle embodiment, the vehicle 100 may include an axle receiving motive power from an electric motor and another axle that receives motive power from an internal combustion engine, during drive operation. Further, in other examples, the electric drive unit may be incorporated into a front wheel drive powertrain or a rear wheel drive powertrain.

The electric drive unit 102 includes a prime mover 104 (e.g., an electric motor, an internal combustion engine, and the like) mechanically coupled to a transmission 106. In the EV example, the electric motor may be a permanent magnet (PM) type motor that may be more generally an alternating current (AC) motor. In such an example, prime mover 104 receives electric power from an inverter 110 that in turn receives electric energy from one or more energy storage device(s) 112 (e.g., traction batteries, capacitors, combinations thereof, and the like). Arrows 150 denote the mechanical power transfer between the prime mover 104 and the transmission 106. Arrows 152 denote the electric power transfer between the prime mover 104 and the inverter 110, and arrows 154 denote the electric power transfer between the inverter 110 and the energy storage device(s) 112. A dog clutch engagement system comprising a sleeve with two or more keys and two or more spring may be integrated as part of the transmission 106 to transmit power to various reduction units of the transmission 106. Mechanical power may be transferred from the transmission 106 to the one or more drive axles 140 via a differential 114.

The vehicle 100 further includes a control system 170 with controller 172 (e.g., an electronic control unit (ECU) such as a transmission control unit (TCU), a vehicle control unit (VCU), combinations thereof, and the like). The controller 172 may be designed to implement control strategies. To accomplish the aforementioned vehicle control functionality, the vehicle controller may include memory 174 which stores instructions executable by a processor 176 to carry out the vehicle control strategies.

One or more input devices 178 such as a drive mode selector, accelerator pedal, brake pedal, touch interface, combinations thereof, and the like may be in electronic communication with the controller 172 as denoted by arrows 180. The drive mode selector may be a button, switch, touch interface, slider, or combinations thereof that allows the vehicle operator to trigger disconnection of the transmission 106 from the drive wheels. For instance, the drive mode selector may allow the vehicle to switch from a two-wheel drive mode to a four-wheel drive mode, when the vehicle includes a second electric axle. The controller 172 may control one or more components of vehicle 100 via one or more actuators 179. For example, an actuator of the one or more actuators 179 may control the disconnection of the transmission 106 from the drive wheels.

An axis system 199 is provided in FIG. 1 for reference. The z-axis may be a vertical axis (e.g., parallel to a gravitational axis), the x-axis may be a lateral axis (e.g., horizontal axis), and/or the y-axis may be a longitudinal axis, in one example). However, the axes may have other orientations, in other examples.

Figure 2:
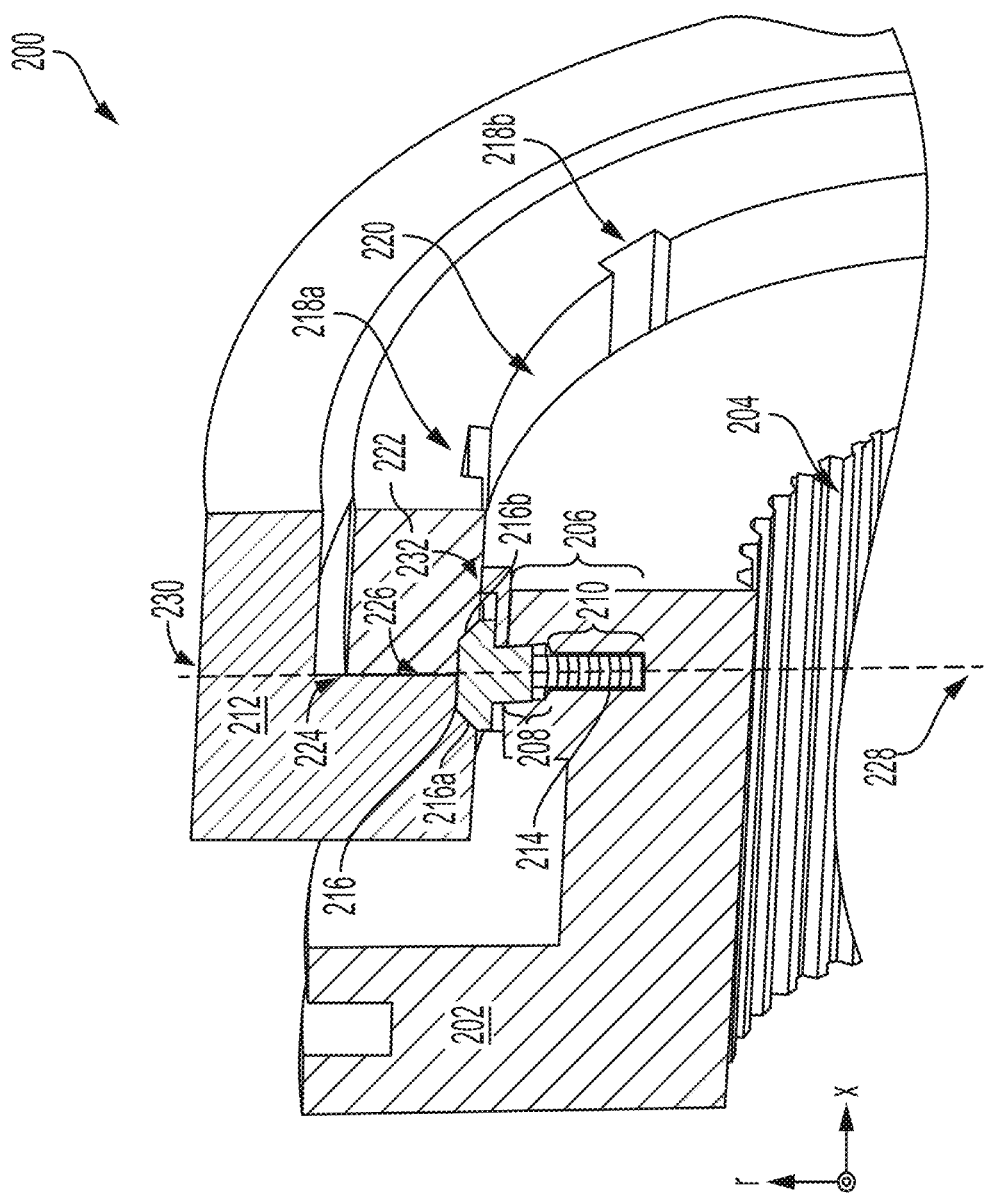
FIG. 2 shows a diagram of a cross-sectional view of a dog clutch engagement system, in accordance with one or more embodiments of the present disclosure.

FIG. 2 shows an example of a dog clutch engagement system 200 of a vehicle, such as the vehicle 100 of FIG. 1. In particular, the dog clutch engagement system 200 may be integrated in transmission 106 of FIG. 1. The dog clutch engagement system 200 may include a clutch comprising a sleeve 202, a first output disk 212 at a first position, and a second output disk 222 at a second position. The sleeve 202, the first output disk 212, and the second output disk 222 may be coaxial and rotatable. The sleeve 202 may be axially movable, enabling the sleeve 202 to align with the first output disk 212 and the second output disk 222. The first output disk 212 may be adjacent to the second output disk 222 and positioned with sufficient axial space between a side 230 of the first output disk and a side 232 of the second output disk to enable the first output disk and the second output disk to rotate independently. The first output disk 212 may also have an internal diameter that exceeds an external diameter of both the sleeve 202 and the second output disk 222 and the second output disk 222 may have an internal diameter that exceeds an external diameter of the sleeve 202. As such, the first output disk 212 may circumferentially surround the sleeve 202 at a first position whereas the second output disk 222 may circumferentially surround the sleeve 202 at a second position, the first position being different than the second position. In this way, the second output disk 222 may be recessed within a space between the sleeve 202 and the first output disk 212 and the first output disk 212 may circumferentially surround both of the sleeve 202 and the second output disk 222.

A length of the side 230 of the first output disk 212 may also exceed a length of the side 232 of the second output disk 222. However, the length of the side 230 decreases abruptly by a length of the side 232, enabling the first output disk 212 and the second output disk 222 to be adjacently positioned. In this way, an internal peripheral surface 224 of the first output disk 212 and an external peripheral surface 226 of the second output disk 222 may be contiguous. A position of the sleeve 202 with respect to a centerline 228 of the dog clutch engagement system. may enable the sleeve to be selectively coupled to one of the first output disk 212 or the second output disk 222. The sleeve 202 being positioned at the centerline 228 may be considered a neutral position of the sleeve. By axially adjusting the position of the sleeve 202 relative to the neutral position of the sleeve, the sleeve 202 may be selectively coupled to one of the first output disk 212 and the second output disk 222 by a radially translatable key, such as a first key 216, that extends from the sleeve and is configured to individually engage with each of the first output disk and the second output disk.

The sleeve 202 may further be provided with a first external cavity 206 of two or more external cavities, the first key 216 of two or more keys, a first spring 214 of two or more springs, and internal teeth 204. In some embodiments, two or more external cavities may include only two external cavities, two or more keys may include only two keys, and two or more springs may include only two springs. In other embodiments, two or more external cavities may include three external cavities, two or more keys may include three keys, and two or more springs may include three springs.

Each key may have a pair of parallel chamfered faces, such as a first chamfered face 216a and a second chamfered face 216b, and may extend from an external cavity, such as the first external cavity 206, of the sleeve 202. The first output disk 212 and the second output disk 222 may both include a plurality of internal cavities, and an internal groove (not shown). The plurality of internal cavities may be positioned along an internal surface 220 of the first output disk 212 or an internal surface of the second output disk 222. As an example, the second output disk 222 may include an internal cavity 218a and an internal cavity 218b, positioned along the internal surface 220 of the second output disk 222. Each external cavity of the sleeve 202 of the two or more external cavities may include a first section 208 and a second section 210 wherein the first section and the second section are contiguous.

The internal teeth 204 may be arranged to mesh with a rotating member of the transmission system of a vehicle to transmit power from a prime mover, such as prime mover 104 of FIG. 1, for example. Each key may be positioned within the first section 208 and each spring may be positioned within the second section 210. In this way, as the sleeve 202 rotates, each spring may push against one key, extending the key, to selectively couple the key with one of the first output disk 212 and the second output disk 222 when the sleeve 202 is not located at the neutral position. In this way, the sleeve 202 may be selectively coupled to one of the first output disk and the second output disk without an actuator having to supply a high axial load to align chamfered teeth of existing dog clutch engagement systems, which may reduce manufacturing costs of the transmission system.

In one example, the first spring 214 may be positioned within the second section 210 of the first external cavity 206 whereas the first key 216 may be positioned within the first section 208. The first spring 214 may push against the first key 216 to couple the first key 216 to one of the first output disk 212 and the second output disk 222. More specifically, as the sleeve 202 rotates (e.g. after axial movement of the sleeve to the second position), the first key 216 may be within a distance threshold of an internal cavity 218a and by extending the first key 216, the first key and the internal cavity may engage, selectively coupling the sleeve 202 and the second output disk 222. In contrast, when the sleeve 202 is located at the neutral position, neither of the first output disk 212 and the second output disk 222 are coupled to the sleeve. Instead, as the sleeve 202 rotates, each spring may push against one key, extending the key, to engage the key with the internal grooves of the first output disk 212 and the second output disk 222.

Figure 3:
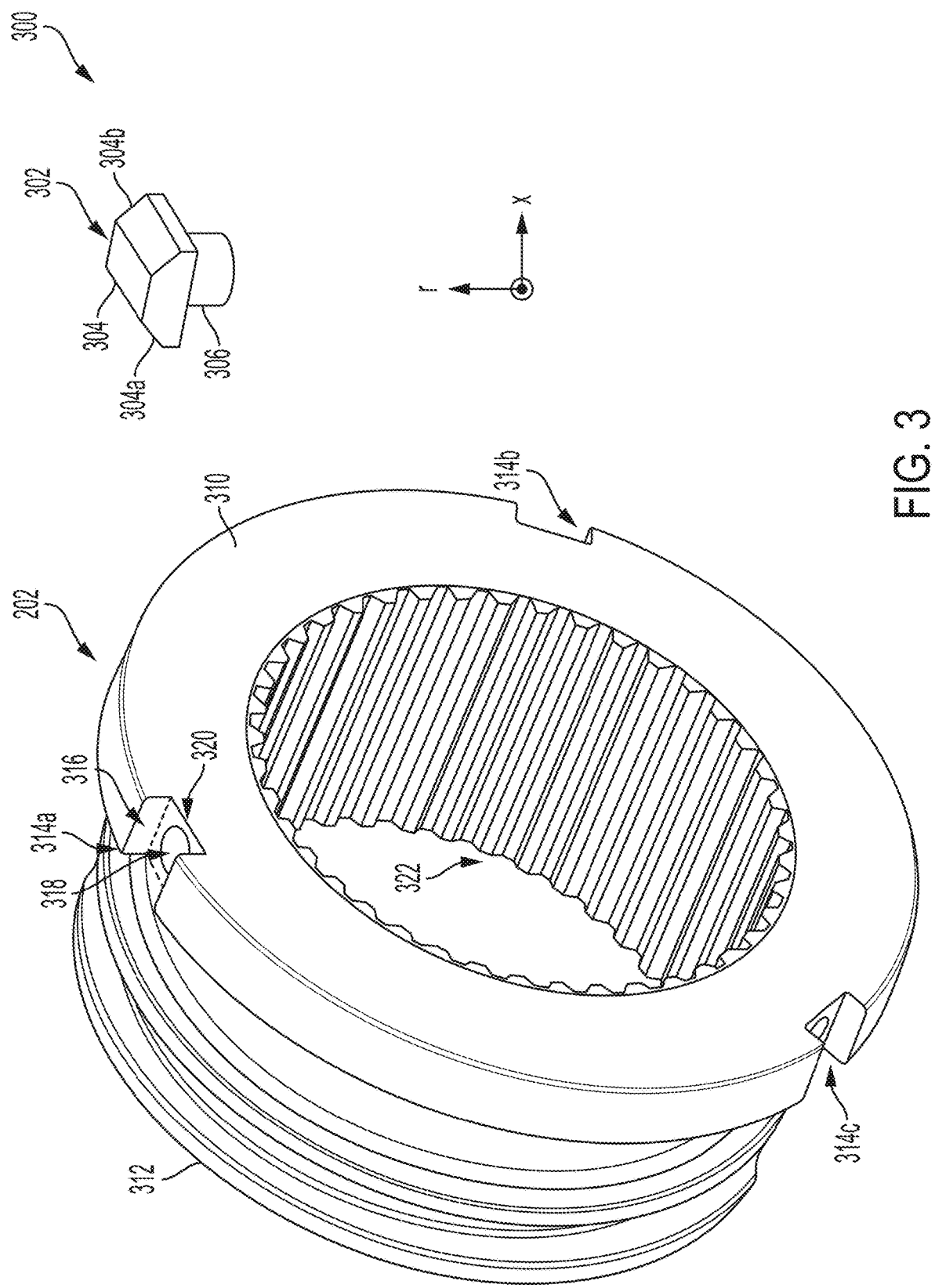
FIG. 3 shows a schematic diagram of a sleeve of a dog clutch engagement system, in accordance with one or more embodiments of the present disclosure.
Figure 4:
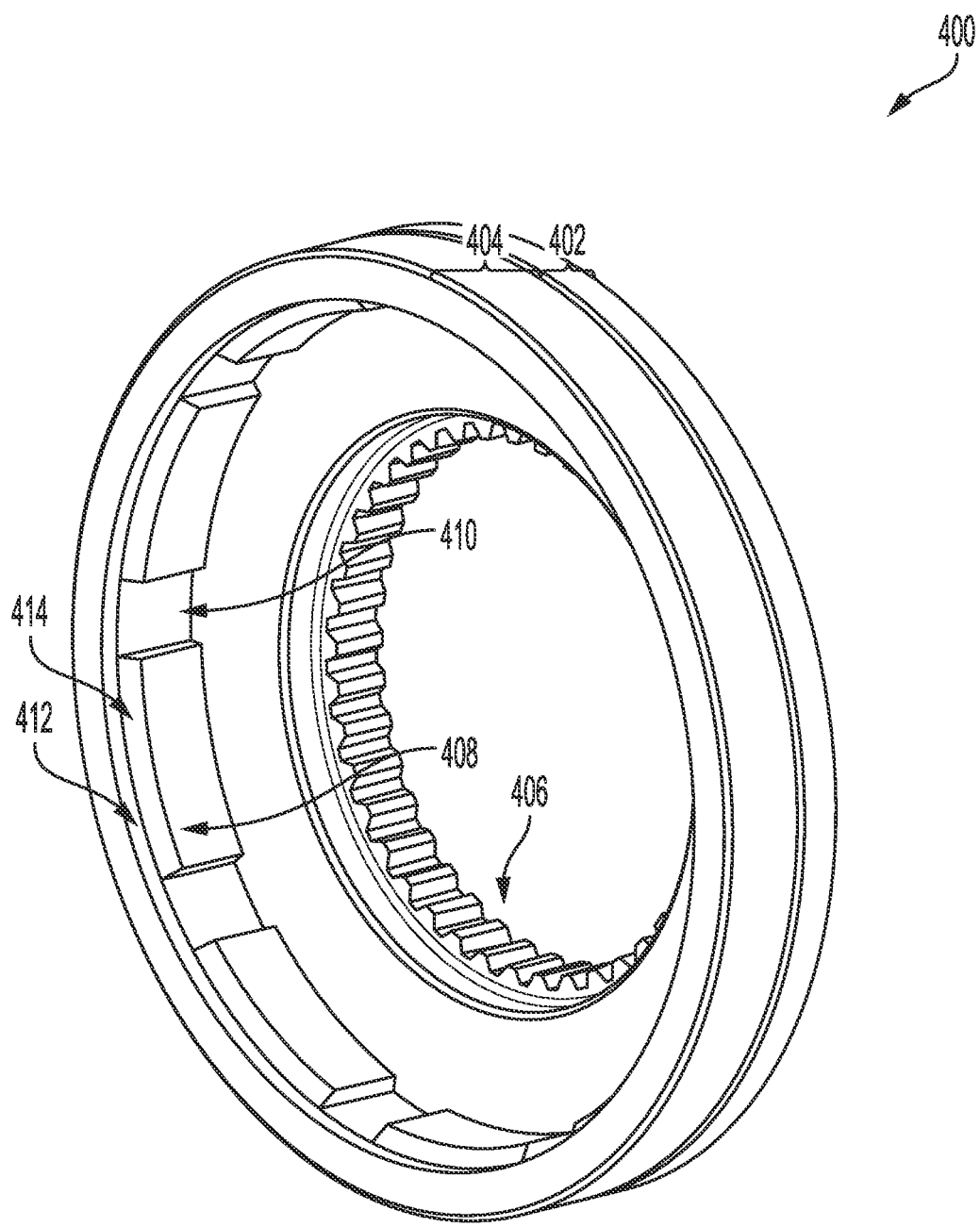
FIG. 4 shows a schematic diagram of an output disk of a dog clutch engagement system, in accordance with one or more embodiments of the present disclosure.

FIG. 3 shows an example of a sleeve assembly 300 of a dog clutch engagement system, such as the dog clutch engagement system 200 of FIG. 2. The sleeve assembly 300 may share at least some of the structural and functional features with the sleeve 202 of FIG. 2. Therefore, redundant description of these overlapping features may be omitted for concision.

The sleeve assembly 300 includes a key 302 and a sleeve 202. Each key 302 comprises a key head 304 and a key shaft 306. The shape of the key head 304 may be a chamfered rectangular prism, the chamfered rectangular prism being a rectangular prism wherein two parallel faces of the rectangular prism are chamfered. For example, each key head 304 may include a first chamfered face 304a and a second chamfered face 304b, and may extend from the sleeve 202.

Each spring of the dog clutch engagement system 200 of FIG. 2 may be coupled to the key shaft 306.

The sleeve 202 is provided with a grooved portion 312, an end portion 310, and internal teeth 322 located on an internal surface of the sleeve 202 that extend from the end portion 310 to an end of the grooved portion 312. The grooved portion 312 includes grooves that couple the sleeve 202 and a fork actuator. The end portion 310 includes two or more external cavities. Each external cavity may be positioned along an exterior surface of the end portion 310 of the sleeve 202 and may extend radially from the exterior surface of end portion 310 of the sleeve 202 toward an internal diameter of the sleeve. Further, each external cavity may be positioned equidistant from each other on the exterior surface of the end portion 310 of the sleeve 202. The two or more external cavities may include a first external cavity 314a, a second external cavity 314b, and a third external cavity 314c. Each key 302 may extend from the first external cavity 314a, the second external cavity 314b, and the third external cavity 314c of the sleeve 202.

Each external cavity may include a first section 316 and a second section 318. The first section 316 may have a square or rectangular cross section and the second section 318 may have a circular cross-section. The first section 316 and the second section 318 are contiguous and the first section 316 transitions to the second section 318 at an interface 320 between the first section and the second section.

FIG. 4 shows an example of an output disk 400 of a dog clutch engagement system, such as the dog clutch engagement system 200 of FIG. 2. The output disk 400 may share at least some of the structural and functional features with the output disks (e.g., the first output disk 212 and the second output disk 222) of FIG. 2. Therefore, redundant description of these overlapping features may be omitted for concision.

The output disk 400, which may be the first output disk 212 or the second output disk 222, may include a plurality of internal cavities 410 and an internal groove 412 positioned on an internal surface 408 on one side of output disk 400 and internal teeth 406 arranged to mesh with a transmission shaft on another side of the output disk 400. The internal teeth 406 be included in a first portion 402 of the output disk 400 and may extend from one end of the output disk 400 to a first length of the output disk 400. The plurality of internal cavities 410 and the internal groove 412 may be included in a second portion 404 of the output disk 400 that extends from an end of the first length of the output disk 400 to the other end of the output disk. The internal groove 412 may be positioned at the other end of the output disk 400. The plurality of internal cavities 410 may be positioned on an internal surface 408 of the output disk 400 and between the end of the first length of the output disk 400 and the internal groove 412. Each internal cavity may be rectangular in shape and equidistantly spaced apart from another internal cavity by one section of the internal surface 408. A lateral surface 414 of the internal groove 412 has a same angle as the chamfered key heads of FIG. 3, which enables the lateral surface to act as a ramp. The keys described in FIG. 3 may be depressed inwards in response to sliding the sleeve axially and a chamfered-face of the key pressing against a lateral surface of the internal groove of an output disk, such as a first output disk or a second output disk.

Figure 5:
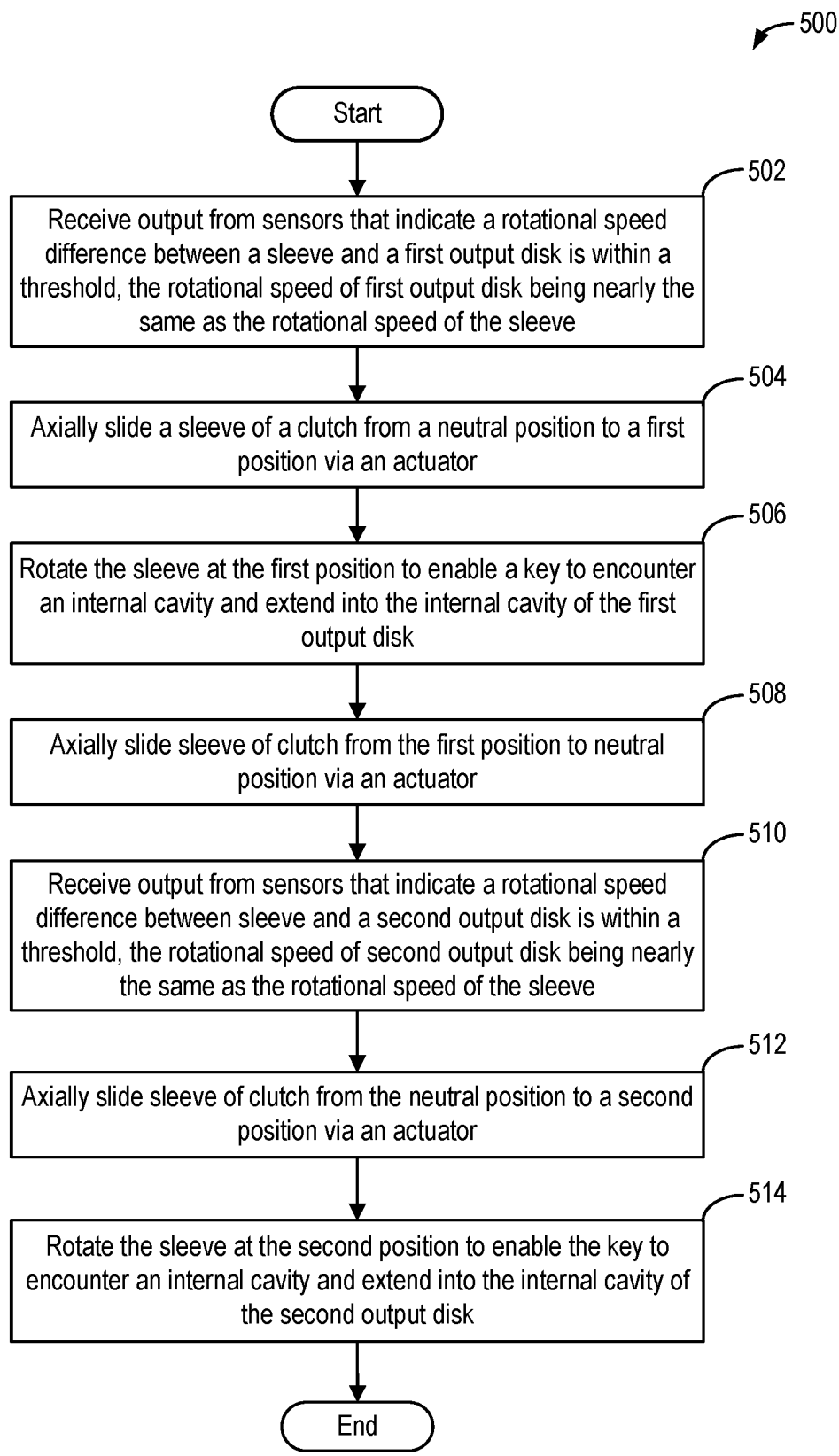
FIG. 5 shows a flowchart illustrating an exemplary method for engaging and disengaging of a dog clutch of a dog clutch engagement system, in accordance with one or more embodiments of the present disclosure.

FIG. 5 shows an example method 500 for operation of a dog clutch engagement system in a transmission system, such as the dog clutch engagement system 200 described above in reference to FIG. 2, in one example. Method 500 may be carried out by a controller, and stored as instructions in memory therein. Instructions for carrying out method 500 may be executed by the controller in conjunction with signals received from sensors of the vehicle, such as the sensors described above with reference to FIG. 1. The controller may employ actuators of the system to adjust operation of the system, according to the method described below.

At 502, the method 500 includes receiving output from sensors that indicate a rotational speed difference between a sleeve and a first output disk is within a threshold, the rotational speed of the first output disk being nearly the same as the rotational speed of the sleeve. Rotation of the sleeve may occur when torque is transmitted to the sleeve via a transmission shaft that is coupled to both of a prime mover, such as prime mover 104 of FIG. 1, and the sleeve. The sleeve and the transmission shaft may be coupled when the internal teeth mesh with the transmission shaft. Torque may be transmitted from the motor via the transmission shaft to the sleeve when the transmission shaft rotates. In this way, torque may be transmitted from the motor to the first output disk when the sleeve is selectively coupled to the first output disk.

A sensor communicatively coupled to the sleeve may monitor the speed of the sleeve as the sleeve rotates. Similarly, a sensor communicatively coupled to the first output disk may monitor the speed of the first output disk. In this way, output received from the sensors may be used to determine a rotational speed difference between the sleeve and the first output disk. The rotational speed difference may be a relative difference in rotation speed between the sleeve and the first output disk or the sleeve and the second output disk. When the rotational speed difference is within the rotational speed difference threshold, or rather, the speed of the rotation speed of the first output disk and the sleeve are nearly identical, an actuator may be used to adjust the position of the sleeve to engage the sleeve and the first output disk. In some embodiments, the actuator may be a fork actuator.

At 504, the method 500 includes axially sliding the sleeve of a clutch from a neutral position to a first position via an actuator. To axially move the sleeve, an actuator may be dimensioned based on the spring forces generated by the two or more keys. In this way, the actuator may be adequately dimensioned to overcome the spring forces generated by the two or more keys that may hinder axial movement of the sleeve when activated.

Prior to axially sliding the sleeve of the clutch, the sleeve may be selectively coupled to neither of a first output disk at a first position and a second output disk at a second position when the sleeve is in a neutral position. For a dog clutch engagement system wherein the first output disk is located to left of a neutral position and the second output disk is located to right of the neutral position (e.g., similar to the dog clutch engagement system of FIG. 2), by axially sliding the sleeve to left of the neutral position, the sleeve may be moved from the neutral position to a first position.

In response to the sleeve being axially moved from the neutral position to the first position, a radially translatable key of the sleeve that is depressed inward (e.g., has a compressed helical spring) may be axially moved from the neutral position to the first position. Once the radially translatable key is located at the first position, the radially translatable key may extend outward (e.g., the helical spring expands) to engage the first output disk and the sleeve.

At 506, the method 500 includes rotating the sleeve at the first position to enable a key to encounter an internal cavity and extend into the internal cavity of the first output disk. As described herein, the sleeve is rotatable. In some embodiments, the sleeve may be stationary when the sleeve is moved axially and may begin rotating once the sleeve is located at the first position. In other embodiments, the sleeve may be rotating when the sleeve is moved axially to the first position.

Spring forces may be generated by a spring coupled to the key and the spring forces may cause the spring to press against the key shaft of the key, which may radially adjust the position of the key, extending the key. Rotation of the sleeve may cause the position of the key relative to the internal cavity to change with time, such that at various points in time, the key may be positioned within the distance threshold of the internal cavity of the first output disk. Being within the distance threshold may enable the two or more keys to extend into two or more internal cavities of the first output disk, each key extending into one internal cavity. An example of the sleeve being coupled to the first output disk is shown below with regards to FIG. 6B.

At 508, the method 500 includes axially sliding the sleeve from the first position to the neutral position via an actuator. Prior to axially sliding the sleeve of the clutch, the sleeve is selectively coupled to the first output disk at the first position. By axially sliding the sleeve to right of the first position, the sleeve may be moved from the first position to the neutral position. In response to the sleeve being axially moved from the first position to the neutral position, a radially translatable key of the sleeve that is extended and engaged with the internal cavity may be axially moved from the first position to the neutral position.

Axial movement of the sleeve may cause the key to axially translate. In this way, the radially translatable key, and thus, the sleeve, may be disengaged from the first output disk. By disengaging the key, the sleeve is no longer coupled to the first output disk and transmission of torque from the motor to the first output disk ceases. In this way, two or more keys of the clutch engagement system may be disengaged from two or more internal cavities of the first output disk when the sleeve is axially moved from the first position to the neutral position. An example of the sleeve being in the neutral position is described below with respect to FIG. 6A. By relying on axial movement of the sleeve to depress the key and the spring coupled to the key and to extend the key into internal cavities of the first output disk, locking of the clutch due to relative positioning of the various components of the clutch (e.g., chamfered dog teeth), drag torques, and the like may not occur when engaging the sleeve with the first output disk.

In the neutral position, the sleeve is unable to be selectively coupled with one of a first output disk and a second output disk. The inability to couple may be due to a key of the sleeve being located in the internal groove of the first output disk and the second output disk and not being located within a distance threshold from an internal cavity of one of the first output disk and the second output disk when the sleeve is rotating. The key is unable to be engaged with the internal cavity when the key is not located within the distance threshold. When the sleeve is in the neutral position, the key rotates in the internal grooves of the first output disk and the second output disk. Since the key rotates in the internal grooves of the first output disk and the second output disk, neither of the first output disk and the second output disk are selectively coupled to the sleeve. As shown herein, adjusting the position of the sleeve may enable the key to be located within the distance threshold from the internal cavity.

At 510, the method 500 includes receiving output from sensors that indicate a rotational speed difference between the sleeve and a second output disk is within a threshold, the rotational speed of the second output disk being nearly the same as the rotational speed of the sleeve. The sensor communicatively coupled to the sleeve may monitor the speed of the sleeve as the sleeve rotates. Similarly, a sensor communicatively coupled to the second output disk may monitor the speed of the second output disk. In this way, output received from the sensors may be used to determine a rotational speed difference between the sleeve and the second output disk. The rotational speed difference may be a relative difference in rotation speed between the sleeve and the second output disk. When the rotational speed difference is within the rotational speed difference threshold, or rather, the speed of the rotation speed of the second output disk and the sleeve are nearly identical, an actuator may be used to adjust the position of the sleeve to engage the sleeve and the second output disk. In some embodiments, the actuator may be a fork actuator.

At 512, the method 500 includes axially sliding the sleeve of a clutch from the neutral position to the second position via an actuator. Prior to axially sliding the sleeve of the clutch, the sleeve may be selectively coupled to neither of the first output disk at the first position and the second output disk at the second position when the sleeve is in the neutral position. By axially sliding the sleeve to right of the neutral position, the sleeve may be moved from the neutral position to the second position. In response to the sleeve being axially moved from the neutral position to the second position, a radially translatable key of the sleeve that is depressed inward (e.g., has a compressed helical spring) may be axially moved from the neutral position to the second position. Once the radially translatable key is located at the second position, the radially translatable key may extend outward (e.g., the helical spring expands) to engage the second output disk and the sleeve.

At 514, the method 500 includes rotating the sleeve at the second position to enable a key to encounter an internal cavity and extend into the internal cavity of the second output disk. As described herein, in some embodiments, the sleeve may be stationary when the sleeve is moved axially and may begin rotating once the sleeve is located at the second position. In other embodiments, the sleeve may be rotating when the sleeve is moved axially to the second position. Spring forces may be generated by a spring coupled to the key and the spring forces may cause the spring to press against the key shaft of the key, which may radially adjust the position of the key, extending the key. Rotation of the sleeve may cause the position of the key relative to the internal cavity to change with time, such that at various points in time, the key may be positioned within the distance threshold of the internal cavity of the second output disk. Being within the distance threshold may enable the two or more keys to extend into the two or more internal cavities of the second output disk, each key extending into one internal cavity. An example of the sleeve being coupled to the second output disk is shown below with regards to FIG. 6C. By relying on axial movement of the sleeve to depress the key and the spring coupled to the key and to extend the key into internal cavities of the second output disk, locking of the clutch due to relative positioning of the various components of the clutch (e.g., chamfered dog teeth), drag torques, and the like may not occur when engaging the sleeve with the second output disk. The method 500 then ends.

It may be understood that the method 500 is exemplary, and other embodiments may differ without departing from the scope of the present disclosure. For example, the arrangement of the first output disk and the second output disk may differ such that axial movement to the left may enable the sleeve and the second output disk to be engaged and axial movement to the right may enable the sleeve and the first output disk to be engaged according to the embodiments described herein. In particular, in another embodiment, the first output disk may be located at the second position and the second output disk may be located at the first position.

FIGS. 6A-6C depict schematic representations of a dog clutch engagement system of a transmission in a vehicle, such as transmission 106 of FIG. 1 in a neutral position 600, a first engaged position 601, and a second engaged position 603. FIGS. 6A-6C provide an overview for how to engage a clutch based on the clutch initially being in a neutral position.

The dog clutch engagement system of FIGS. 6A-6C may be an embodiment of the dog clutch engagement system 200 of FIG. 2. The dog clutch engagement system of FIGS. 6A-6C may include a clutch comprising a sleeve 202 that is axially movable, rotatable, and provided with two or more keys and two or more springs, and a first output disk 212 in a first position and a second output disk 222 in a second position that are rotatable and provided with internal teeth arranged to mesh with a rotating member of the transmission, a plurality of internal cavities, and an internal groove (not shown). One of the first output disk 212 and second output disk 222 may be selectively coupled to the sleeve [602] 202. The sleeve 202 may be selectively coupled to one of the first output disk 212 or the second output disk 222 by axially adjusting a position of the sleeve to couple the two or more keys with one of the first output disk or the second output disk. A dotted line 618 may indicate a neutral position or a centered position of the sleeve 202. In some embodiments, the first output disk may be coupled to a carrier of a reduction unit whereas the second output disk may be coupled to a pinion of the reduction unit.

More specifically, the dog clutch engagement system may include the sleeve 202, the first output disk 212, and the second output disk 222 in a similar arrangement as depicted above with respect to FIGS. 2-4. The sleeve 202 may include internal teeth 604 arranged to mesh with a rotating member of the transmission (e.g., an input shaft), two or more external cavities positioned on the external surface of the sleeve, two or more keys and two or more springs positioned within the two or more external cavities. Each key may include a key head 610 and a key shaft 610c. The key head may have chamfered faces, such as a first chamfered face 610a and a second chamfered face 610b. In one embodiment, the dog clutch engagement system of FIGS. 6A-6C may include an external cavity 616 that encloses a spring 606 coupled to a key 608 via the key shaft 610c.

Turning to FIG. 6A, the dog clutch engagement system is in the neutral position 600. The dog clutch engagement system may be in the neutral position 600 when the key 608 of the sleeve 202 is aligned with the dotted line 618. Based on the configuration of the dog clutch engagement system depicted, the neutral position 600 may be achieved by axially sliding the sleeve 202 right from the first position when coupled to the first output disk 212 or axially sliding the sleeve 202 left from the second position when coupled to the second output disk 222. Due to an alignment of the key 608 of the sleeve 202 with the dotted line 618, the sleeve 202 is unable to be coupled with either of the first output disk 212 and the second output disk 222 via the key 608.

The inability of the sleeve 202 to be coupled with either of the first output disk 212 and the second output disk 222 may be due to the key 608 being positioned within the internal grooves of the first output disk and the second output disk and not being positioned within a distance threshold of an internal cavity of one of the first output disk or the second output disk when the spring 606 radially presses against the key 608, and more specifically against the key shaft 610c. Accordingly, the two or more keys rotate within the internal grooves of the first output disk 212 and the second output disk 222 as the sleeve 202 rotates due to torque being transmitted to the sleeve from the motor via the transmission shaft. Thus, torque is not transmitted to either of the first output disk and the second output disk.

Now referring to FIG. 6B, the dog clutch engagement system is in a first engaged position 601. The dog clutch engagement system may be in the first engaged position 601 when the position of the sleeve 202 is axially adjusted to left of the dotted line 618. Based on the configuration of the dog clutch engagement system depicted, the first engaged position 601 may be achieved by axially sliding the sleeve 202 left from the neutral position when coupled to neither of the first output disk 212 and the second output disk 222. By axially adjusting the position of the sleeve 202 to left of the dotted line 618, the sleeve 202 may be coupled with the first output disk 212 since key 608 may no longer be positioned within the internal groove and may be positioned within a distance threshold of one internal cavity of the first output disk 212. In this way, the key 608 may extend into one of the plurality of internal cavities of the first output disk 212 in response to a rotational speed difference threshold being satisfied. In some embodiments, the one internal cavity may be the internal cavity 620a of the plurality of internal cavities, depending on the relative position of the internal cavity 620a while the sleeve 202 rotates.

As one example, when the sleeve 202 is rotating and the rotational speed difference threshold between the sleeve 202 and the first output disk 212 is satisfied, forces generated by compression of the spring 606 may cause the spring 606 to radially press against the key 608 of the sleeve 202 via the key shaft 610c when the sleeve is moved axially. In response, the key 608 is moved radially in the direction of and into one of the internal cavities, such as the internal cavity 620a. The key 608 may extend into the internal cavity 620a to interlock the key 608 as the sleeve 202 rotates. In some embodiments, an actuator, may be dimensioned based on the forces generated by the spring 606. In this way, the actuator may have sufficient mechanical force to axially slide the sleeve 202 from the neutral position to the first position.

Turning to FIG. 6C, the dog clutch engagement system is in a second engaged position 603. The dog clutch engagement system may be in the second engaged position 603 when the position of the sleeve 202 is axially adjusted to right of the dotted line 618. Based on the configuration of the dog clutch engagement system depicted, the second engaged position 603 may be achieved axially sliding the sleeve 202 right from the neutral position when coupled to neither of the first output disk 212 and the second output disk 222. By axially moving the position of the sleeve 202 to right of the dotted line 618, the sleeve 202 may be coupled with the second output disk 222 since key 608 may no longer be positioned within the internal groove and may be positioned within a distance threshold of one internal cavity of the second output disk 222. In this way, the key 608 may extend into an internal cavity of the second output disk 222 in response to rotational speed difference threshold between the sleeve 202 and the second output disk 222 being satisfied. In some embodiments, the one internal cavity may be the internal cavity 614a or the internal cavity 614b of the plurality of internal cavities, depending on the relative position of the internal cavity 614a and the internal cavity 614b while the sleeve 202 rotates.

As one example, when the sleeve 202 is rotating and the rotational speed difference threshold between the sleeve 202 and the second output disk 222 is satisfied, forces generated by compression of the spring 606 may cause the spring 606 to radially press against the key 608 of the sleeve 202 via the key shaft 610c when the sleeve is moved axially. In response, the key 608 is moved radially in the direction of and into one of the internal cavities, such as the internal cavity 614a. The key 608 may extend into the internal cavity 614a to interlock the key 608 and the internal cavity 614a as the sleeve 202 rotates. In some embodiments, an actuator, may be dimensioned based on the forces generated by the spring 606. In this way, the actuator may have sufficient mechanical force to axially slide the sleeve 202 from the neutral position to the second position.

FIG. 7. shows an example of a dog clutch engagement system integrated in a section 700 of a transmission of a vehicle, such as the transmission 106 of FIG. 1. The dog clutch engagement system of the section 700 of the transmission may share at least some of the structural and functional features with the dog clutch engagement system of FIGS. 2-4. Therefore, redundant description of these overlapping features is omitted for concision.

The dog clutch engagement system of the section 700 may include a clutch comprising an axially movable sleeve 202 configured with two or more external cavities, two or more keys, two or more springs, internal teeth arranged to mesh with a rotating member, a first output disk 212 and second output disk 222 configured with a plurality of internal cavities, internal teeth arranged to mesh with a rotating member, and an internal groove. The sleeve 202, the first output disk 212, and the second output disk 222 may be coaxial. Additionally, the second output disk 222 may circumferentially surround the sleeve 202 and the first output disk 212 may circumferentially surround the sleeve 202 and the second output disk 222.

The two or more external cavities (e.g., not shown) enclose the two or more springs coupled to the two or more keys. For example, an external cavity (e.g., not shown) may enclose a spring 708 coupled to a key 706. The key 706 may be one of the two or more keys and the spring 708 may be one of the two or more springs. The key 706 of the sleeve 202 may be individually engaged with an internal cavity of one of the first output disk 212 and the second output disk 222, coupling the sleeve 202 and one of the first output disk and the second output disk.

The section 700 may further include a pinion gear 718 coupled to a first crown 716 of a first epicyclic unit. The first crown 716 may be positioned between the clutch and an output shaft 714. The first crown 716 may also be orthogonal to the input shaft 704. The input shaft 704 may extend in an axial direction and may be coupled to a prime mover, such as prime mover 104 of FIG. 1. In this way, torque may be transmitted from the prime mover to the sleeve 202 via the input shaft 704. The output shaft 714 may be coupled to drive wheels. In some embodiments, the output shaft 714 may be coupled to the wheels via a differential, such as differential 114 of FIG. 1.

In some embodiments, when the sleeve 202 is axially moved, the spring forces generated from depressing the key 706 inwards may be released to extend the key 706 and engage the key 706 with the internal cavity of one of the first output disk 212 and the second output disk 222. Once the sleeve 202 is an engaged position according to the embodiments described herein with respect to FIGS. 6B and 6C, torque may be transmitted from the sleeve to one of the first output disk 212 and the second output disk 222. The section 700 of the transmission system may include a second crown 722 of a second epicyclic unit that is adjacent to the sleeve 202, the second crown being located to left of the sleeve.

When the sleeve 202 is engaged with the first output disk 212, torque is transmitted from the sleeve to the first output disk 212, the first output disk being rigidly coupled to a carrier of the epicyclic unit. The epicyclic unit may be rigidly coupled to the output shaft 714. By engaging the sleeve 202 and the first output disk 212, the output shaft 714 rotates at the same speed as the sleeve. In contrast, when the sleeve 202 is engaged with the second output disk 222, torque is transmitted from the sleeve to the second output disk 222, the second output disk being rigidly connected to the pinion gear 718 of the epicyclic unit that meshes with the satellites of a carrier. As shown in section 700, the first crown 716 of the epicyclic unit is rigidly coupled to a transmission box and consequently, it is unable to rotate. However, in some embodiments, when the sleeve 202 and the second output disk 222 are engaged, the output shaft 714 will rotate at a speed lower than that of the sleeve depending on the reduction ratio of the epicyclic unit. In additional embodiments, first output disk 212 and the second output disk 222 may be coupled to other components of the transmission that are not included in the epicyclic unit.

It may be understood that the embodiments described herein may be integrated into transmission systems other than the system described with respect to FIG. 7. The transmission system of FIG. 7 is exemplary and does not limit the scope of the present disclosure.

When compared with existing dog clutch engagement systems, the present disclosure is flexible to modifications in that the disclosure may be adapted based on spacial constraints of the transmission system and desired torque transmission. In particular, the number of radially translatable keys may be selected based on the desired torque transmission. Further, the present disclosure may be implemented in various transmission systems since the dog clutch engagement system does not rely on specific or pre-determined arrangements of splines, toolings, fixtures, and the like in a transmission system. Due to the simplicity of the dog clutch engagement system, the dog clutch engagement system described herein may be implemented in transmission systems wherein a standard spline may encounter manufacturability problems.

By implementing the dog clutch engagement system as described herein in a section, such as section 700, of a transmission system, the dog clutch engagement system may prevent engagement problems seen in existing dog clutch engagement systems, such as engagement problems due to a relative position of the parts, drag torques, and the like. For example, the current disclosure does not rely on engaging and disengaging chamfered dog teeth and dog teeth recesses. Instead, the disclosure relies on adjusting the position of an axially movable sleeve to depress a key inward. Axially moving the sleeve to a different position from the initial position may position the key within a distance threshold of an internal cavity of one of the first output disk and the second output disk. Spring forces generated due to the key and the spring coupled to the key being depressed may be released to extend the radially translatable key into an internal cavity. By relying on axial movement of the sleeve to depress the key and the spring coupled to the key and to extend the key into internal cavities of the first output disk, locking of the clutch due to relative positioning of the various components of the clutch (e.g., chamfered dog teeth), drag torques, and the like may not occur when engaging the sleeve with one of the first output disk and the second output disk.

A technical effect of implementing a dog clutch engagement system comprising an axially movable sleeve, a first output disk at a first position, a second output disk at a second position, and a radially translatable key that extends from the sleeve and is configured to individually engage with each of the first output disk and the second output disk is that locking of the dog clutch may be reduced. In particular, locking may be reduced due to axial movement of the sleeve causing the key to depress inward (e.g., via compression of a spring coupled to the key) and being released in response to the key being axially moved from a neutral position and being within a distance threshold of a cavity of one of the first output disk and the second output disk.

The disclosure also provides support for a clutch engagement system of a transmission system, comprising: a sleeve that is axially movable, a first output disk at a first position, a second output disk at a second position, and a radially translatable key extending from the sleeve and configured to individually engage with each of the first output disk and the second output disk. In a first example of the system, the sleeve, the first output disk, and the second output disk are coaxial, and the second output disk circumferentially surrounds the sleeve, and the first output disk circumferentially surrounds both of the second output disk and the sleeve. In a second example of the system, optionally including the first example, the sleeve is provided with a grooved portion and an end portion comprising two or more external cavities and internal teeth arranged to mesh with a rotating member of the transmission system. In a third example of the system, optionally including one or both of the first and second examples, each external cavity is positioned equidistantly along an exterior surface of the end portion of the sleeve and each external cavity contains one spring of two or more springs.

In a fourth example of the system, optionally including one or more or each of the first through third examples, each external cavity comprises a first section with a square or rectangular cross section and a second section with a circular cross section, the first section and the second section being contiguous. In a fifth example of the system, optionally including one or more or each of the first through fourth examples, the radially translatable key is one key of two or more keys and each key comprises a key head and key shaft and each spring is positioned within the second section of each external cavity and coupled to one key via the key shaft. In a sixth example of the system, optionally including one or more or each of the first through fifth examples, a shape of the key head is a chamfered rectangular prism, the chamfered rectangular prism being a rectangular prism wherein two parallel faces of the rectangular prism are chamfered and wherein each key head is positioned within the first section of each external cavity.

In a seventh example of the system, optionally including one or more or each of the first through sixth examples, both of the first output disk and the second output disk comprise a plurality of internal cavities and an internal groove positioned on an internal surface on one side of the first output disk and the second output disk and internal teeth arranged to mesh with a transmission shaft on another side of the first output disk and the second output disk. In an eighth example of the system, optionally including one or more or each of the first through seventh examples, each internal cavity is positioned along the internal surface of the first output disk and the second output disk and equidistantly spaced apart from another internal cavity by one section of the internal surface of either the first output disk or the second output disk. In a ninth example of the system, optionally including one or more or each of the first through eighth examples, the first output disk is arranged to mesh with a carrier of a reduction unit and the second output disk is arranged to mesh with a pinion of the reduction unit.

The disclosure also provides support for a method for operating a clutch, comprising: receiving output from sensors that indicate a rotational speed difference between a sleeve and a first output disk is within a rotational speed difference threshold, a rotational speed of the first output disk and the sleeve being nearly the same, axially sliding the sleeve of the clutch from a neutral position to a first position via an actuator, and rotating the sleeve at the first position to enable a key to encounter an internal cavity and extend into the internal cavity of the first output disk. In a first example of the method, the key encounters the internal cavity when the key is positioned within a distance threshold from the internal cavity. In a second example of the method, optionally including the first example, the key extends into the internal cavity in response to a spring forces generated by the key being depressed inward being released.

In a third example of the method, optionally including one or both of the first and second examples, the method further comprises: axially sliding the sleeve of the clutch from the first position to the neutral position, receiving output from sensors that indicate the rotational speed difference between sleeve and a second output disk is within a threshold, the rotational speed of the second output disk and the sleeve being nearly the same, axially slide sleeve of clutch from the neutral position to a second position via the actuator, and rotate the sleeve at the second position to enable the key to encounter the internal cavity and extend into the internal cavity of the second output disk. In a fourth example of the method, optionally including one or more or each of the first through third examples, the sleeve is not selectively coupled to either of the first output disk and the second output disk and the key extends into internal grooves of the first output disk and second output disk and rotates within the internal grooves when the sleeve is located at the neutral position.

The disclosure also provides support for an engagement system, comprising: a clutch comprising a sleeve that is axially slidable, rotatable, and provided with two or more keys, two or more springs, and internal teeth arranged to mesh with a rotating member, and a first output disk in a first position and a second output disk in a second position that are rotatable and provided with internal teeth arranged to mesh with the rotating member, a plurality of internal cavities, and an internal groove, the sleeve being selectively coupled to one of the first output disk or the second output disk by axially adjusting a position of the sleeve and extending the two or more keys into with one of the first output disk or the second output disk. In a first example of the system, the sleeve is selectively coupled to the first output disk in the first position by axially adjusting the position of the sleeve to left of a neutral position, the first position being left of the neutral position. In a second example of the system, optionally including the first example, sleeve is selectively coupled to the second output disk in the first position by axially adjusting the position of the sleeve to right of the neutral position, the second position being right of the neutral position. In a third example of the system, optionally including one or both of the first and second examples, in response to being within a distance threshold of one internal cavity, each spring radially presses against one key, extending the key into one internal cavity of one of the first output disk and second output disk to selectively couple the sleeve to one of the first output disk or the second output disk. In a fourth example of the system, optionally including one or more or each of the first through third examples each key is disengaged from each internal cavity and depressed inwards in response to sliding the sleeve axially and a chamfered-face of the key pressing against a lateral surface of the internal groove of the first output disk or the second output disk.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various powertrain and/or vehicle configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the electric motor control system, where the described actions are carried out by executing the instructions in a system in combination with the electronic controller.

It will be appreciated that the configurations and routines disclosed herein are exemplary in nature, and that these specific embodiments are not to be considered in a limiting sense, because numerous variations are possible. For example, the above technology can be applied to various types of vehicle and powertrain configurations. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A clutch engagement system of a transmission system, comprising:
    a sleeve that is axially movable;
    a first output disk at a first position;
    a second output disk at a second position, and
    a radially translatable key extending from the sleeve and configured to individually engage with each of the first output disk and the second output disk, wherein both of the first output disk and the second output disk comprise a plurality of internal cavities and an internal groove positioned on an internal surface on one side of the first output disk and the second output disk and internal teeth arranged to mesh with a transmission shaft on another side of the first output disk and the second output disk.

2. The clutch engagement system of claim 1, wherein each internal cavity is positioned along the internal surface of the first output disk and the second output disk and equidistantly spaced apart from another internal cavity by one section of the internal surface of either the first output disk or the second output disk.

3. The clutch engagement system of claim 1, wherein the first output disk is arranged to mesh with a carrier of a reduction unit and the second output disk is arranged to mesh with a pinion of the reduction unit.

4. A clutch engagement system of a transmission system, comprising:
    a sleeve that is axially movable;
    a first output disk at a first position;
    a second output disk at a second position, and
    a radially translatable key extending from the sleeve and configured to individually engage with each of the first output disk and the second output disk, wherein the sleeve, the first output disk, and the second output disk are coaxial, and the second output disk circumferentially surrounds the sleeve, and the first output disk circumferentially surrounds both of the second output disk and the sleeve.

5. The clutch engagement system of claim 4, wherein the sleeve is provided with a grooved portion and an end portion comprising two or more external cavities and internal teeth arranged to mesh with a rotating member of the transmission system.

6. The clutch engagement system of claim 5, wherein each external cavity is positioned equidistantly along an exterior surface of the end portion of the sleeve and each external cavity contains one spring of two or more springs.

7. A clutch engagement system of a transmission system, comprising:
    a sleeve that is axially movable;
    a first output disk at a first position;
    a second output disk at a second position, and
    a radially translatable key extending from the sleeve and configured to individually engage with each of the first output disk and the second output disk, wherein the sleeve is provided with a grooved portion and an end portion comprising two or more external cavities and internal teeth arranged to mesh with a rotating member of the transmission system and each external cavity comprises a first section with a square or rectangular cross section and a second section with a circular cross section, the first section and the second section being contiguous.

8. The clutch engagement system of claim 7, wherein the radially translatable key is one key of two or more keys and each key comprises a key head and key shaft and each spring is positioned within the second section of each external cavity and coupled to one key via the key shaft.

9. The clutch engagement system of claim 8, wherein a shape of the key head is a chamfered rectangular prism, the chamfered rectangular prism being a rectangular prism wherein two parallel faces of the rectangular prism are chamfered and wherein each key head is positioned within the first section of each external cavity.

10. A method for operating a clutch, comprising:
    receiving output from sensors that indicate a rotational speed difference between a sleeve and a first output disk is within a rotational speed difference threshold, a rotational speed of the first output disk and the sleeve being nearly the same;
    axially sliding the sleeve of the clutch from a neutral position to a first position via an actuator;
    rotating the sleeve at the first position to enable a key to encounter an internal cavity of the first output disk and extend into the internal cavity of the first output disk;
    axially sliding the sleeve of the clutch from the first position to the neutral position;
    receiving output from sensors that indicate the rotational speed difference between the sleeve and a second output disk is within a threshold, the rotational speed of the second output disk and the sleeve being nearly the same;
    axially sliding the sleeve of the clutch from the neutral position to a second position via the actuator; and rotating the sleeve at the second position to enable the key to encounter an internal cavity of the second output disk and extend into the internal cavity of the second output disk.

11. The method of claim 10, wherein the key encounters the internal cavity when the key is positioned within a distance threshold from the internal cavity.

12. The method of claim 10, wherein the key extends into the internal cavity in response to a spring forces generated by the key being depressed inward being released.

13. The method of claim 10, wherein the sleeve is not selectively coupled to either of the first output disk and the second output disk and the key extends into internal grooves of the first output disk and second output disk and rotates within the internal grooves when the sleeve is located at the neutral position.

14. An engagement system, comprising:
a clutch comprising a sleeve that is axially slidable, rotatable, and provided with two or more keys, two or more springs, and internal teeth arranged to mesh with a first rotating member, a first output disk in a first position that is rotatable and provided with internal teeth arranged to mesh with a second rotating member, and a second output disk in a second position that is rotatable and provided with internal teeth arranged to mesh with a third rotating member, a plurality of internal cavities, and an internal groove, the sleeve being selectively coupled to one of the first output disk or the second output disk by axially adjusting a position of the sleeve and extending the two or more keys into one of the first output disk or the second output disk.

15. The engagement system of claim 14, wherein the sleeve is selectively coupled to the first output disk in the first position by axially adjusting the position of the sleeve to left of a neutral position, the first position being left of the neutral position.

16. The engagement system of claim 15, wherein the sleeve is selectively coupled to the second output disk in the second position by axially adjusting the position of the sleeve to right of the neutral position, the second position being right of the neutral position.

17. The engagement system of claim 14, wherein in response to being within a distance threshold of one internal cavity, each spring radially presses against one key, extending the key into one internal cavity of one of the first output disk and the second output disk to selectively couple the sleeve to one of the first output disk or the second output disk.

18. The engagement system of claim 17, wherein each key is disengaged from each internal cavity and depressed inwards in response to sliding the sleeve axially and a chamfered-face of the key pressing against a lateral surface of the internal groove of the first output disk or the second output disk.

* * * * *